Sept. 12, 1933.   C. S. BUSHNELL ET AL   1,926,865
RUBBER INSULATED COIL AND METHOD OF MAKING THE SAME
Filed April 16, 1932
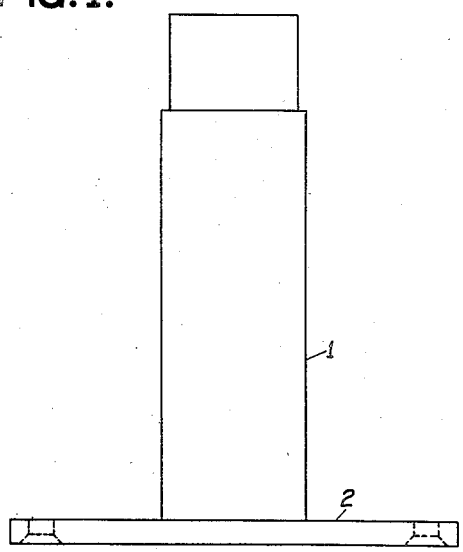
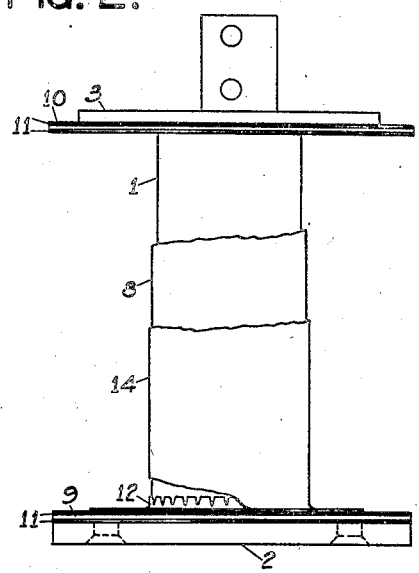
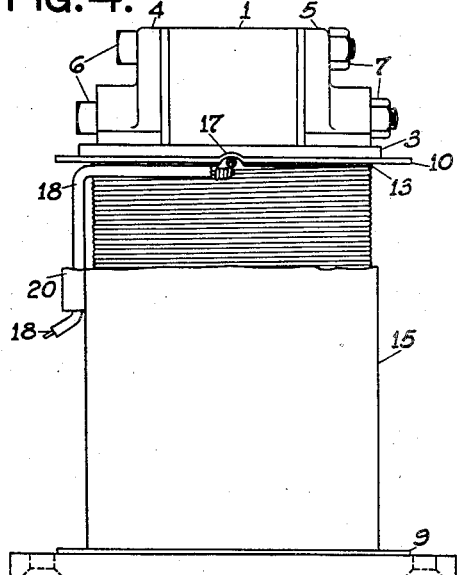
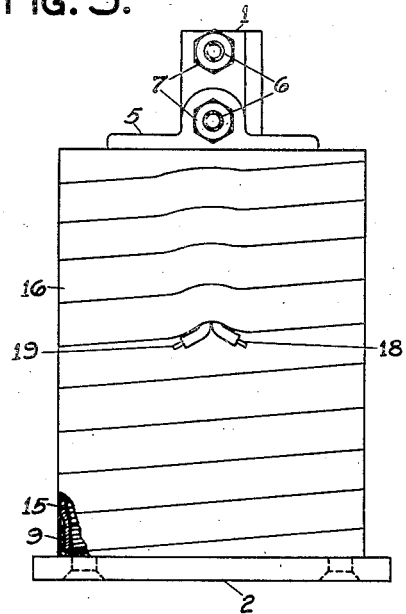
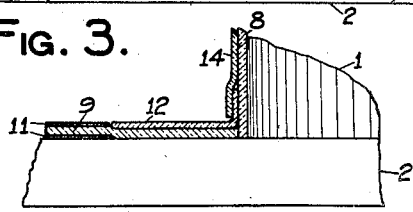
INVENTORS,
C. S. Bushnell and E. H. Branson,
BY Neil W. Preston
THEIR ATTORNEY.

Patented Sept. 12, 1933

1,926,865

UNITED STATES PATENT OFFICE 1,926,865

RUBBER INSULATED COIL AND METHOD OF MAKING THE SAME

Charles S. Bushnell and Edward H. Branson, Rochester, N. Y., assignors to General Railway Signal Company, Rochester, N. Y.

Application April 16, 1932. Serial No. 605,705

13 Claims. (Cl. 175—21)

This invention relates to electro-magnets and method for making the same, and more particularly relates to the insulation and protection of the windings of such electro-magnets.

In manufacturing coils for electric apparatus which is subjected to various unfavorable conditions, it is necessary to provide means for protecting the windings from short-circuit and other damage due to the collection of moisture, acids, or other corrosive or deteriorating foreign substances. It is often the practice to impregnate such coils with an insulating compound which will completely permeate the windings and when hardened is effective to completely seal the coil from foreign substances. However, such coils may be subjected to shocks or vibrations which may fracture this compound as well as the wire itself or its insulation and may also provide a means for moisture or other substances to enter the windings and effect the characteristics of the coil.

In view of the above, it is proposed in accordance with the present invention, to construct an electro-magnetic coil having a covering of resilient material which completely encloses the coil so as to exclude all injurious foreign materials and yet which is not subject to fracture due to shocks or vibrations. It is further proposed to protect the resilient covering of the coil by a coating which prevents damage or deterioration thereof by corrosive foreign substances.

Other objects, purposes and characteristic features of the invention will appear as the description thereof progresses, during which reference will be made to the accompanying drawing which shows the invention in a manner to make it easily understood rather than with the view of showing the particular construction preferably employed in practice and in which:—

Fig. 1 is an elevational view of a core upon which a coil is to be wound in accordance with the present invention;

Fig. 2 is an elevational view of the core of Fig. 1 as prepared to receive the windings of a coil and is shown with parts broken away to illustrate the fabrication thereof;

Fig. 3 is an enlarged sectional view of a portion of Fig. 2 in an intermediate stage of fabrication;

Fig. 4 is an elevational view of an intermediate stage in the covering of a coil with parts thereof broken away; and Fig. 5 is an elevational view of a completed coil in accordance with the present invention, with a part thereof shown in section.

Referring now to the drawing, a core 1 is shown with a pole face 2 attached thereto, such as by welding, or these parts may of course in some cases be integral. This core may either be of solid construction, or laminated, according to the requirements, and is provided with a means for attaching a coil retaining member. This retaining member, in the embodiment illustrated, is a fibre washer 3 which, when the coil is assembled, is held in place by brackets 4 and 5, clamped by through bolts 6 and nuts 7.

In fabricating a coil, the core 1 and the inside of the pole face 2 is to be thoroughly cleaned such as by sand blasting and washed with cleaning material such as benzine. A coat of suitable priming cement, such as Vulcalock cement, is then applied to the core 1, the inside of the pole face 2, and the inside of the end washer 3, and this is allowed to dry for a sufficient length of time or about 15 minutes. These same parts are then coated with a suitable rubber cement and allowed to thoroughly dry.

A sheet of uncured rubber 8 is then wrapped around the body of the core 1, and ironed down smoothly thereon to eliminate all air pockets. A rubber washer 9 having an outside diameter slightly larger than the diameter of the completed coil and an inside diameter approximately equal to the diameter of the core is then cut, and the portion thereof which will extend beyond the coil is covered on each side by washers 11 of thin material such as linen. This rubber washer 9 is then placed over the rubber covered core 1 and pressed down firmly on the inside of the pole face 2. A rubber washer 10 similar to the washer 9 which is prepared in like manner with the protecting linen washers 11, is placed on the inside of the end washer 3 and pressed firmly in place.

A fibre washer 12 having a flanged inside edge as shown in Fig. 2 is then placed over the rubber covered core 1 and pressed down firmly against the rubber washer 9. This fibre washer 12 has an outside diameter which is approximately equal to the outside diameter of the completed coil and therefore rests inside the linen protecting washer 11. A similar fibre washer 13 is placed on the rubber washer 10 which is secured to the end washer 3 and pressed firmly in place the same as is the washer 12.

This group of washers, namely, the end washer 3 carrying the rubber washer 10 and the fibre washer 13 is then assembled on the end of the core and held in place by the brackets 4 and 5 as previously stated. A sheet of fibre 14 is then wrapped around the rubber covered core in a manner to overlap the inturned flanges of the fibre washers 12 and 13 and is held by cementing down the free end, and it may be expedient to bind with a few turns of tape, until thoroughly dry.

The complete core, as now assembled, is placed in an oven at a temperature of approximately 270° Fahrenheit, for a period of at least from 20 to 30 minutes and in some cases longer, as up to 1½ hours. This partially vulcanizing the rubber end washers to the rubber wrapping around the core and serves, in general, to unite the core insulation before winding the coil thereon.

After the core assembly is thoroughly cool the coil may be wound thereon by a machine suitable for the purpose and this coil is of course of such size wire and number of turns as required in the particular application. The method of bringing out the lead from the beginning or the bottom lead of this coil is shown in Fig. 4 and this consists in covering the first turn of the coil with varnished cambric or spaghetti tubing and bringing this end to the outside of the coil through a radial slot 17, in the fibre end washer 3. The rubber washer 10 is pressed into this slot and the fibre washer 13 is cut away in front of the slot 17 to allow this lead to rest therein away from the other turns of the coil. This coil wire is then soldered to a flexible rubber covered lead wire 18 which may be doubled back in a set back in the coil or a space left in the top surface and carried about a quarter way around the coil to a position shown in Fig. 4.

The other end of the winding or the top lead is brought out in a similar manner, or that is, the last turn may be insulated by a fabric tubing (not shown) and carried around to a position opposite the bottom lead 18, shown in Fig. 4, where it is soldered to a flexible rubber covered lead wire 19, and brought to a position along side the first lead wire shown in Fig. 4. These leads 18 and 19 may be thoroughly taped with a suitable rubber tape 20, and a coat of suitable rubber cement is then applied to the outside of these windings and to the rubber lead wires and allowed to thoroughly dry.

A sheet of uncured rubber 15, similar to that applied to the core 1, is then wrapped around the entire outside surface of the windings by starting the end directly under the point where the lead wires leave the coil and overlapping the end to form a complete rubber covering. This covering should be thoroughly smoothed out and ironed down with a suitable tool so as to unite with the turns of the winding and to smooth out all air pockets which may be present.

The linen washers 11 are now removed from the extending ends or peripheral bands of the rubber washers 9 and 10, and this extending portion of these washers are thoroughly cleaned with benzine or the like. The ends of these washers are now folded over the rubber covering 15 and are rolled down with a suitable tool so as to knit thoroughly into place as shown in the sectional part of Fig. 5.

The rubber covered leads are now placed partway down the side of the coil against the rubber covering 15 as shown in Fig. 4, and the voids at either side thereof and at the point of leaving the coil are filled with pieces of uncured rubber. A small sheet of uncured rubber, not shown, is then placed tightly over these leads so as to hold them firmly against the sides of the rubber covered coil, and is then rolled down smoothly to insure proper knitting to the sides thereof.

The entire sides of the coil are now covered with water moistened linen tape 16 which is pulled tight to hold down the rubber covering. The coil is then finally curved by placing it in an oven at a temperature of approximately 270° Fahrenheit for a minimum time of from 45 to 60 minutes. It is also to be understood that in some cases in which a considerable amount of iron is employed in the magnetic structure a longer curing time at this temperature is required, which time may be as long as 1½ hours. This thoroughly vulcanizes the complete rubber covering of the coil to form a homogeneous rubber insulation around the winding and the coil leads.

When the coil has cooled to room temperature, a coat of suitable rubber primer, is applied to the outside thereof and allowed to thoroughly dry. Upon this is placed a suitable acid-proof coating to thoroughly cover and protect the outside of the coil and is allowed to dry for a sufficient length of time.

A moisture proof and corrosion-proof coil and a method of making the same has now been shown and described, and it is obvious that a coil for use in electro-magnetic purposes constructed in this manner will be thoroughly protected from water or other foreign substances which may tend to enter the winding and cause deterioration thereof or which may tend to directly cause short-circuits or otherwise alter the characteristic of the winding. It is also obvious that the coil is not only electrically insulated from the core, and from external objects, but is also insulated by a resilient material which will not transmit shocks which may be received by the core thereby preventing fracture of wires or wire insulation.

Having thus described an electro-magnet and the method of making the same as a specific embodiment of the present invention, it is desired to be understood that this form is selected to facilitate in the disclosure of the invention rather than to limit the number of forms which it may assume; and it is to be further understood that various modifications in the specific form shown, and various other lines of procedure in the method of manufacturing may be applied to meet the requirements of practice without in any manner departing from the spirit or scope of the present invention except as limited by the appended claims.

Having thus described our invention, what we claim is:—

1. An electro-magnet comprising an iron core, a rubber sleeve around said core, a rubber washer vulcanized to each end of said rubber sleeve, a fibre sleeve over said rubber sleeve, a fibre washer adjacent each of said rubber washers and having flanged inner edges held by said fibre sleeve, a coil on said fibre sleeve between said fibre washers and a rubber sleeve over said coil and vulcanized to said rubber washers.

2. In an electro-magnet, a core, a rubber sleeve vulcanized to said core, rubber washers vulcanized to each end of said rubber sleeve, a fibre sleeve over said rubber sleeve, fibre washers adjacent said rubber washers and held in place by said fibre sleeve, a coil on said fibre sleeve, an outside rubber sleeve over said coil and vulcanized to said rubber washers so as to completely enclose said coil, and a coating of protecting material over said outside rubber sleeve.

3. In an electro-magnet, a core, a rubber covering vulcanized to said core, a coil wound over said rubber covering, rubber washers covering each end of the coil and vulcanized to said rubber covering, rubber covering leads extending from said coil, and a rubber covering vulcanized to said coil and leads and to said end rubber washers to form a water-tight covering around said coil.

4. In an electro-magnet, a core, a rubber sleeve vulcanized to said core, rubber washers vulcanized to each end of said rubber sleeve, fibre washers over said rubber sleeve and adjacent said rubber washers, a fibre sleeve over said rubber sleeve and over inturned flanges of said fibre washers, a coil on said fibre sleeve between said fibre washers, rubber covered lead wires extending from said coil, an outside rubber sleeve vulcanized to said coil and to inturned edges of said rubber washers and rubber sealing means vulcanized to said rubber covered lead wires and to said outside rubber sleeve to form a water-tight electro-magnet coil.

5. A method for making an electro-magnet, comprising, forming an iron core having an enlarged pole face, thoroughly cleaning said core and pole face, applying a coat of rubber cement thereto, applying a sleeve of uncured rubber to the body of said core, applying a washer of uncured rubber to the inside of said pole face, placing a fibre washer on said core and against said rubber washer, forming a coil retaining member for the end of said core, applying a coat of rubber cement thereto, applying a washer of uncured rubber to the inside surface thereof, applying a fibre washer to this rubber washer, placing the coil retaining member thus arranged on the end of said core, placing a sleeve of fibre over said rubber covered core to bind inturned flanges of said fibre washers, submitting the iron core thus fitted to a temperature of approximately 270° Fahrenheit for from 20 to 30 minutes, then winding a coil having rubber covered lead-in wires onto the core thus insulated with vulcanized rubber, applying a sleeve of uncured rubber over the wound coil, closing the end of said sleeve by inwardly folding the edges of said rubber washers thereover, applying a covering of moistened unshrunk linen tape over the rubber sleeve of the coil, submitting the electro-magnet thus formed to a temperature of approximately 270° Fahrenheit for a minimum time of from 45 to 60 minutes to vulcanize the rubber parts thereof into a unitary structure, and finally, coating the outside of said coil with an acid-resisting material.

6. The method of making an electro-magnet, comprising, applying a sleeve of uncured rubber to an iron core, applying end washers of uncured rubber to said sleeve, placing the iron core thus covered with rubber in an oven at a temperature of approximately 270° Fahrenheit for about twenty minutes or longer, then winding a coil on the rubber spool so formed, in covering the coil with a sleeve of uncured rubber, beading the edges of said rubber end washers over the ends of the last said sleeve, and then placing the electro-magnet so formed in an oven at a temperature of approximately 270° Fahrenheit for about 45 minutes or longer.

7. A method for making a moisture tight and corrosion proof electro-magnet, comprising, applying a coat of rubber cement on an iron core, placing a sleeve of uncured rubber on said core, applying end washers of uncured rubber so as to unite with said sleeve, winding a coil on the rubber spool so formed having lead-in wires which are rubber covered, applying a sleeve of uncured rubber on top of the wound coil with the ends of the sleeve fastened to said rubber washers by beading the washers over onto the sleeve, and submitting the electro-magnet so formed to a temperature of approximately 270° Fahrenheit for a minimum time of approximately 45 minutes to vulcanize the rubber parts into a unitary structure.

8. A method for making a moisture tight and corrosion proof electro-magnet, comprising, applying a coat of rubber cement to a core of magnetic material, applying a sleeve of uncured rubber on said core, applying end washers of uncured rubber so as to unite with said sleeve, winding a coil on the rubber spool so formed having lead-in wires which are rubber covered, applying a sleeve of uncured rubber on top of the wound coil having the ends of the last said sleeve fastened to said rubber washers by folding the washers over onto the sleeve and placing said lead-in wires on the side of the outer sleeve and sealing them thereto with uncured rubber, and then submitting the electro-magnet so formed to a temperature of approximately 270° Fahrenheit for 45 minutes or more to vulcanize the rubber parts into a unitary structure.

9. A method of making a moisture tight and corrosion proof electro-magnet, comprising, applying a coat of rubber cement to an iron core, applying a sleeve of uncured rubber on said core, applying end washers of uncured rubber so as to unite with said sleeve, winding a coil in the rubber spool so formed having lead-in wires which are rubber covered, applying a sleeve of uncured rubber on top of the wound coil with the ends of the uncured sleeve fastened to said rubber washers by beading the washers over onto the sleeve, with said lead-in-wires placed on the side of the upper sleeve and sealing them thereto with uncured rubber, applying a covering of water-moistened linen tape to the coil, and then submitting the electro-magnet so formed to a temperature of approximately 270° Fahrenheit for 45 minutes or more to vulcanize the rubber parts into a unitary structure.

10. A method of making a moisture tight and corrosion proof electro-magnet, comprising, applying a coat of rubber cement to a core, placing a sleeve of uncured rubber on said core, applying end washers of uncured rubber so as to unite with said sleeve, winding a coil in the rubber spool so formed having lead-in wires which are rubber covered, placing a sleeve of uncured rubber on top of the wound coil with the sleeve ends fastened to said rubber washers by beading the washers over onto the sleeve, placing said lead-in wires on the side of the top sleeve and sealing them thereto with pieces of uncured rubber, applying a covering of damp unshrunk fabric tape to the coil, then submitting the electro-magnet so formed to a temperature of approximately 270° Fahrenheit for 45 minutes or more to vulcanize the rubber parts into a unitary structure and then applying a coat of acid-proof material to the coil.

11. A method for making electro-magnetic devices, comprising, forming a spool having its body of magnetic material, covering the body and inner faces of the spool ends with uncured rubber, protecting a peripheral band of rubber on each spool face against the effect of heat, then vulcanizing the article thus formed, then placing a coil on the spool, covering the coil with uncured rubber, and folding the said peripheral bands against the cover on the coil, and then vulcanizing the resulting article.

12. A method for making electro-magnetic devices, comprising, forming a spool having its body of magnetic material, covering the body and inner faces of the spool ends with uncured rubber, protecting a peripheral band of rubber on each spool face against the effect of heat and the collection of foreign substances by applying thereto linen washers, submitting the article thus formed to a temperature of approximately 270° Fahrenheit for approximately 20–30 minutes, placing a coil on the spool, covering the coil with uncured rubber, removing the protective linen washers, folding the said peripheral bands against the covering on the coil, and then submitting the article thus formed to a temperature of approximately 270° Fahrenheit for approximately 45 minutes or more.

13. A method for making electro-magnetic devices, comprising, forming a spool having its body of magnetic material, covering the body and inner faces of the spool ends with uncured rubber, protecting a peripheral band of rubber on each spool face against the effect of heat by applying thereto protective washers, submitting the article thus formed to a temperature of approximately 270° Fahrenheit for approximately 20–30 minutes, placing a coil on the spool, covering the coil with uncured rubber, removing the protective washers, folding the said peripheral bands against the covering on the coil, and then submitting the article thus formed to a temperature of approximately 270° Fahrenheit for approximately 45 minutes or more.

CHARLES S. BUSHNELL.
EDWARD H. BRANSON.